(12) United States Patent
Södö et al.

(10) Patent No.: US 7,593,244 B2
(45) Date of Patent: Sep. 22, 2009

(54) LIMIT FOR THE HARMONICS OF A CURRENT

(75) Inventors: Nicklas Södö, Vaasa (FI); Lasse Kortelahti, Långåminne (FI); Jaakko Ollila, Pirkkala (FI)

(73) Assignee: Vacon OYJ, Vaasa (FI)

( * ) Notice: Subject to any disclaimer, the term of this patent is extended or adjusted under 35 U.S.C. 154(b) by 47 days.

(21) Appl. No.: 12/076,229

(22) Filed: Mar. 14, 2008

(65) Prior Publication Data

US 2008/0259658 A1  Oct. 23, 2008

(30) Foreign Application Priority Data

Mar. 16, 2007 (FI) .................................. 20070212

(51) Int. Cl.
*H02M 1/12* (2006.01)
(52) U.S. Cl. ............................. 363/47; 363/37; 323/250
(58) Field of Classification Search .................. 363/37, 363/40–48; 323/247, 250; 336/110
See application file for complete search history.

(56) References Cited

U.S. PATENT DOCUMENTS

| 4,338,561 | A | * | 7/1982 | Zaengl et al. .................. 363/37 |
| 4,710,735 | A | | 12/1987 | Blahous et al. |
| 5,905,642 | A | | 5/1999 | Hammond |
| 6,075,425 | A | * | 6/2000 | Gopfrich et al. .............. 363/47 |

* cited by examiner

*Primary Examiner*—Jessica Han
(74) *Attorney, Agent, or Firm*—Birch, Stewart, Kolasch & Birch, LLP

(57) ABSTRACT

A wiring arrangement and an appliance for limiting the harmonics of a current supplied to a frequency converter from an AC electricity supply network, which frequency converter can be connected to a three-phase AC electricity supply network, in which frequency converter is an uncontrolled network bridge (10) for rectifying the AC voltage of the AC electricity supply network, a DC intermediate circuit, in which is a filtering capacitor ($C_{DC}$), and a load bridge (11) provided with power semiconductor switches for forming three-phase AC voltage (U, V, W), and which load bridge can be controlled with pulse-width modulation by means of a control unit, and in which DC intermediate circuit is a choke, in which is a choke part (L1, L2) arranged on both the positive and the negative pole, and in which wiring arrangement is an absorption circuit for limiting the harmonics of the current supplied from the AC electricity supply network, in which

- the absorption circuit is arranged in the DC intermediate voltage circuit,
- the absorption circuit contains a serial connection of a choke (L3) and a capacitor (C1) connected in parallel with a filter capacitor ($C_{DC}$),
- the choke of the DC intermediate voltage circuit is a two-branch DC choke wound onto the common core, which contains pillars and the yokes between them, and
- in which an additional pillar for the choke of the absorption circuit is arranged in the magnetic core of the choke.

20 Claims, 5 Drawing Sheets

LIMIT FOR THE HARMONICS OF A CURRENT

FIELD OF TECHNOLOGY

Limits are set in international electrotechnical standards for the harmonic content of the current taken from the mains supply by appliances connected to an electricity distribution network (e.g. IEC 61000-3-12; Limits for harmonic currents produced by equipment connected to public low-voltage systems with input current >16A and <75A per phase and EN12015; Electromagnetic compatibility—Product family standard for lifts, escalators and moving walks—Emission).

The object of this invention is an arrangement with which the harmonics of the current taken from the mains supply by a frequency converter can be limited.

PRIOR ART

The limits set by the standards apply to both the magnitude of individual harmonic currents and to their overall effect (THD, Total Harmonic Distortion). For example, the limit according to the aforementioned standard IEC 61000-3-12 in a symmetrical three-phase mains supply with a short-circuit ratio 250 (short-circuit ratio=short-circuit output of the mains supply/rated output of the appliance) for the 5th harmonic is 40% of the fundamental wave and for the THD 48%. The corresponding limit values according to standard EN12015 are 30% and 35%, respectively.

Figure 1:
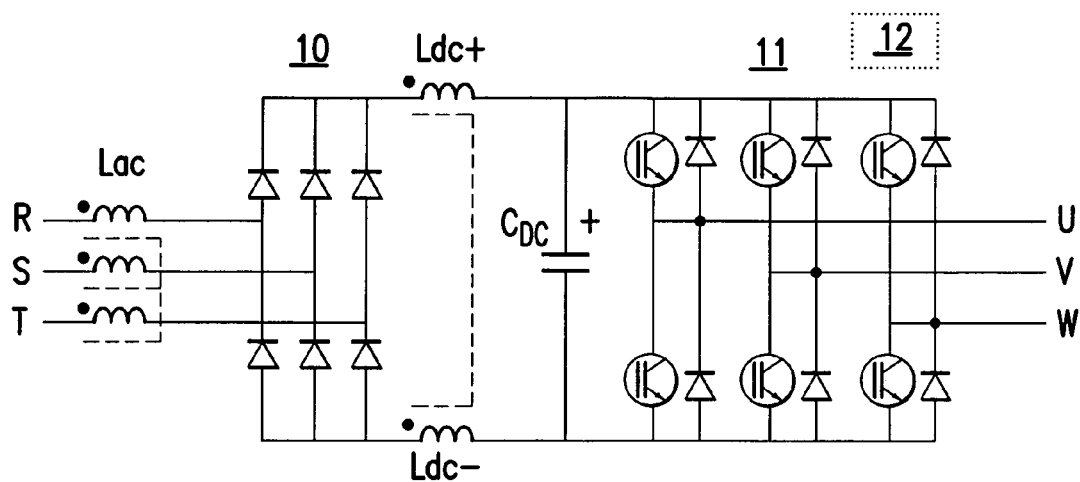

In the most common frequency converter solution, the simplified main circuit of which is presented in FIG. 1, the three-phase voltage of the mains supply is rectified with a diode bridge 10 into constant DC voltage, which is filtered with a capacitor $C_{DC}$. Three-phase output voltage U, V, W in the rectified direction 11 is formed from the DC voltage with fast power semiconductor switches, e.g. IGBT thyristors. The amplitude and frequency of the output voltage can be steplessly adjusted by controlling the length of time that the power switches conduct (PWM, Pulse Width Modulation). The rectifier circuit normally comprises either an AC choke $L_{AC}$ situated on the AC side of the rectifier bridge 11 or a DC choke $L_{DC}$ situated on its DC side.

General speaking, the greater the inductance of the AC choke or the DC choke, the smaller are the harmonics of the mains current. In the case of an AC choke, increasing the inductance, however, results in an increase in the prevailing voltage loss above it, which in turn reduces the DC voltage of the intermediate circuit and thus also the maximum level of the achievable output voltage. For this reason the inductance value of the AC choke must normally be limited to be such that its voltage loss is 3-4% of the supply voltage. With lower inductance values than this the harmonics, especially the 5th, are too great. Since the choke is one of the largest and most expensive components of a frequency converter, increasing the inductance is in other respects not generally reasonable, regardless of whether an AC choke or a DC choke is used. For this reason, limiting the harmonics of a mains supply purely by means of a choke does not produce a good end result.

In a DC choke application, in which the current flows in only one direction, the core of the choke magnetizes in only one direction. It is prior art to use a permanent magnet as a part of the core structure in order to utilize the other half of the magnetizing area, and via that to put into use the full capacity of the core and to minimize the size, e.g. according to patent publication U.S. Pat. No. 6,753,751.

To minimize the size of the choke core the magnetic flux created by the permanent magnet is the opposite with respect to the magnet flux formed by the external current; the purpose of the dimensioning can be e.g. that the density of the magnetic flux with 0-current is a negative 70% of the saturation limit and with full current the same magnitude but positive.

Owing to the opposite flux caused by the external current, a demagnetization risk is attached to DC choke solutions utilizing a permanent magnet. The flux density, with which the permanent magnet demagnetizes, depends on the material used and the temperature, typically being 1.0 . . . 1.4 T (tesla). The saturation flux density of the transformer plate generally used in chokes is in the range of 1.4 . . . 1.6 T. That being the case, if the current of the choke substantially exceeds the dimensioned level, the external flux can exceed the demagnetizing limit of the permanent magnet, in which case it loses its original magnetic properties and can even magnetize in the wrong direction. This kind of situation is possible with unforeseeable large overcurrents, such as those which can occur in frequency converters e.g. in conjunction with a mains outage if the voltage of the DC capacitor of the intermediate circuit has dropped very low when the mains voltage returns. After this kind of situation the DC choke has permanently lost some of its mains current filtering properties.

Figure 2:
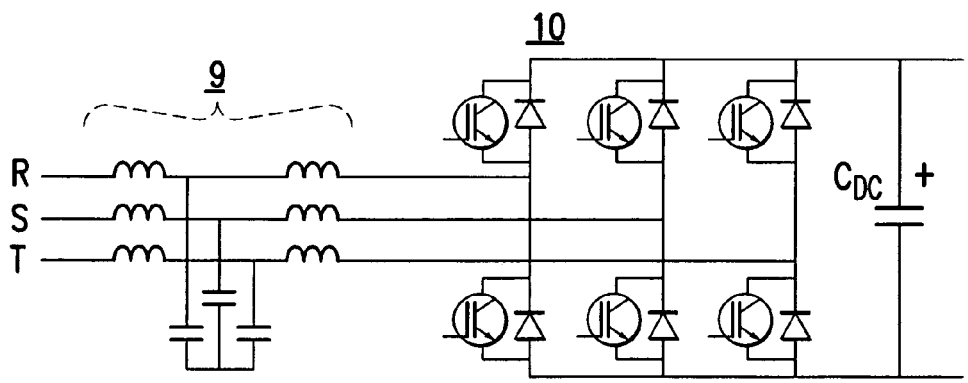

In those types of frequency converters in which e.g. an active rectifying bridge according to FIG. 2 is used, for feeding braking energy into the mains network, the network current achieved is almost sinusoidal (THD <5%). The costs of the solution are, however, substantially greater than the diode bridge version, owing to the active bridge 10 and the filtering unit 9. Therefore this kind of solution is only considered in special cases.

There is also a prior-art solution in which separate so-called absorption circuits for limiting harmonics are arranged in the mains supply network. Also this kind of solution is such that it is not generally used owing to the costs.

SUMMARY OF THE INVENTION

The object of this invention is a new type of absorption circuit, with which the harmonics of the mains current of the frequency converter is limited at reasonable cost to below the level required by the electrotechnical standards. Likewise, the solution according to the invention reduces the ripple of the intermediate circuit voltage, which has the preferred effect on, among other things, stress on the filter capacitor and performance of the motor regulation.

A DC choke is used in the solution according to the invention, in which an extra pillar and its windings are arranged. A capacitor is connected in series with this extra winding, which together form an effective absorption circuit in the intermediate circuit of the frequency converter. Since all the windings of the choke are disposed in a common core structure, they also have a certain mutual inductance, which does not however have any special significance from the standpoint of the operation of the absorption circuit. Owing to the integrated choke solution, the costs of the solution remain reasonable.

The object of this invention is also a DC filter choke solution used in the absorption circuit and provided with a permanent magnet, in which solution there is no danger of demagnetization of the permanent magnet.

In the choke provided with a permanent magnet according to the invention the cross-section surfaces of the pillar parts and the yoke parts of the magnetic core that are situated on the path of the main flux are of different magnitudes and the permanent magnet is situated either in one or several corners of the core structure transversely at an angle. The layout makes it possible according to the invention for the cross-section surface of the permanent magnet to be appreciably larger than the cross-section surface of the pillar of the thinner section of the core structure.

Since the same flux penetrates both the core structure and the permanent magnet, the flux density in the permanent magnet remains lower than in the core of the choke. The choke according to the invention is dimensioned such that when the thinner section of the core structure saturates, the flux density at the point of the permanent magnet remains below its demagnetization limit. Since the flux density of the core does not significantly change after the saturation limit even if the current of the choke were to grow, thus the demagnetization limit of the permanent magnet is not exceeded in any practical conditions.

From the standpoint of the operation of the absorption circuit according to the invention, it is essential that a low-loss capacitor is used. Owing to the high equivalent series resistance (ESR), a general electrolytic capacitor cannot thus be used in this circuit. Plastic capacitors based on polypropylene film technology, which are becoming more widespread in new-generation frequency converters, are well suited to the solution according to the invention.

By selecting the resonance frequency of the absorption circuit suitably, the desired filtering effect is achieved over a wide mains frequency range. The mains frequencies most commonly used around the world are either 50 Hz or 60 Hz, for both of which a suitable compromise for the frequency of the resonance circuit is 290 Hz.

An additional advantage achieved with one absorption circuit solution according to the invention is that the total power factor PF improves, to a reading of approx. 0.95. With a conventional DC choke solution a reading of 0.9 is normally achieved. The total power factor is determined as follows:

$$PF = \frac{I_1}{I_{RMS}} \times \cos\varphi_1$$

where
$I_1$=the RMS value of the fundamental wave of the mains current
$I_{RMS}$=the total value of all the harmonics of the mains current
$\cos\varphi_1$=the cosine of the angle between the voltage and the fundamental wave of the current.

The characteristic features of the solution according to the invention are described in detail in claim 1, and the characteristic features of its preferred embodiments in the other claims.

SHORT DESCRIPTION OF THE DRAWINGS

Figure 3:
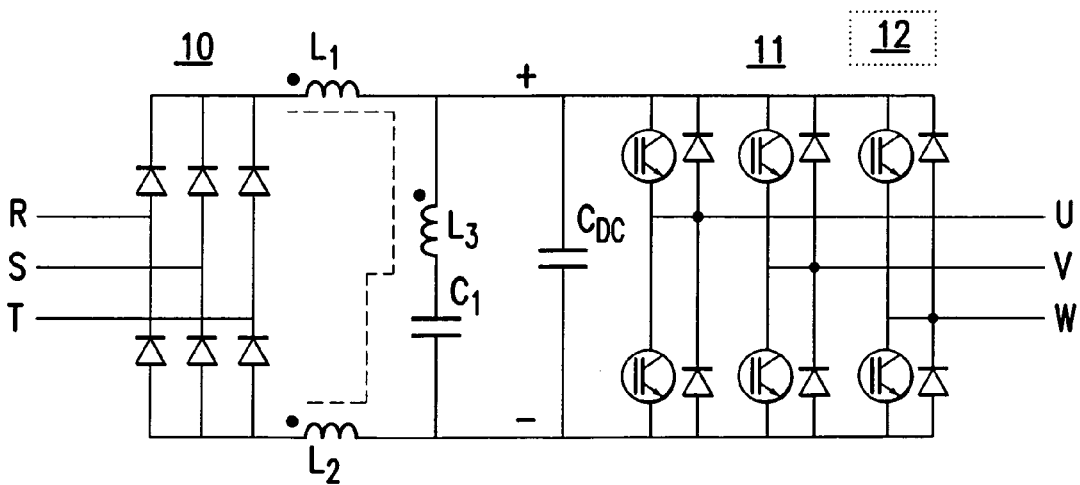
Figure 4:
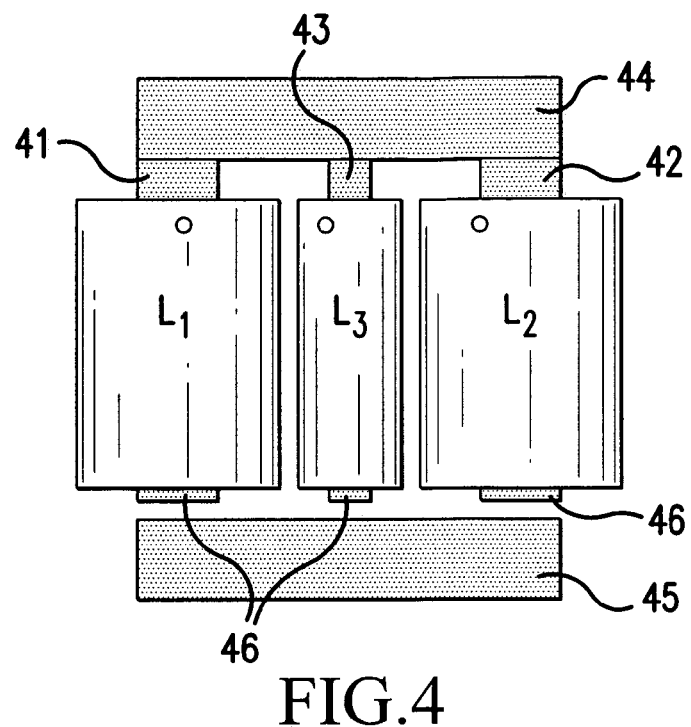
Figure 5:
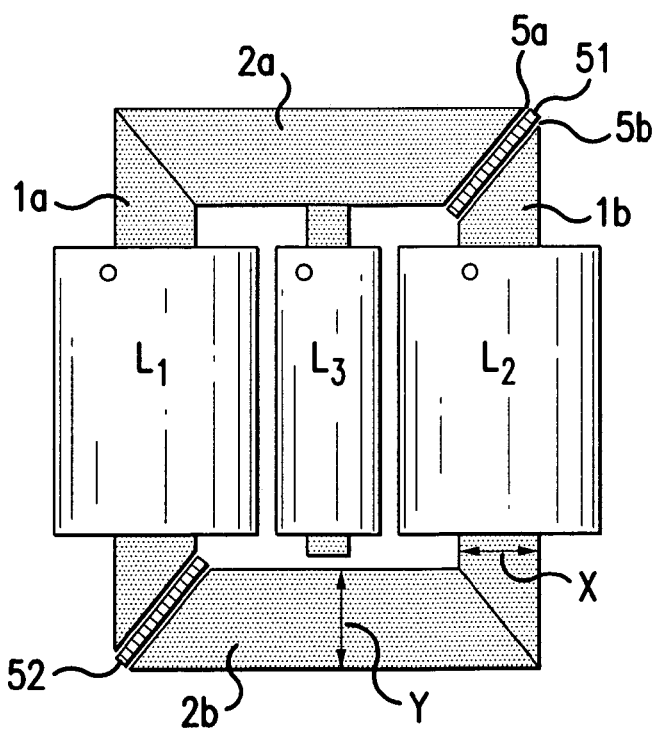
Figure 6:
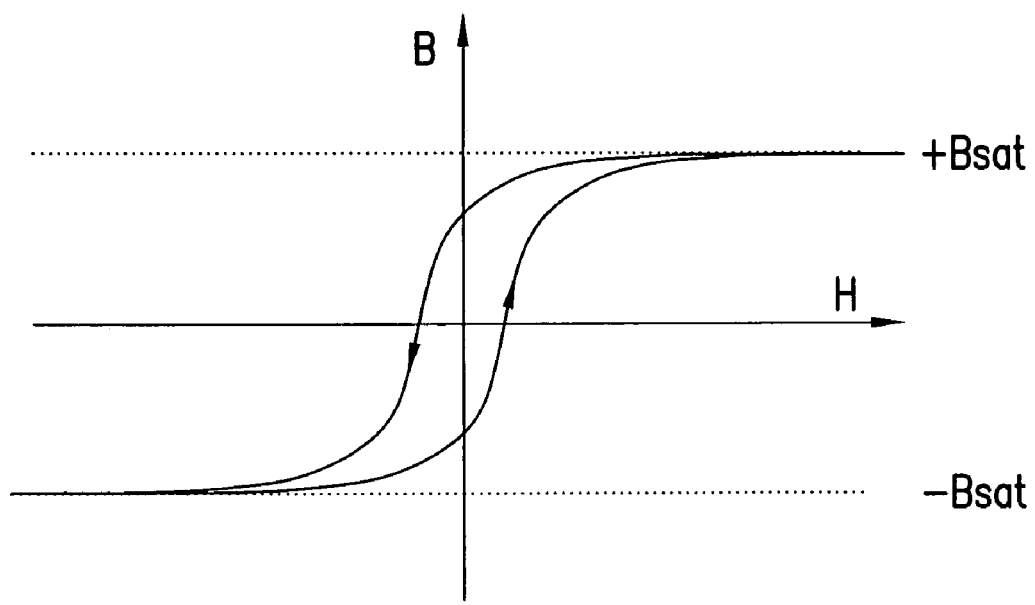
Figure 7:
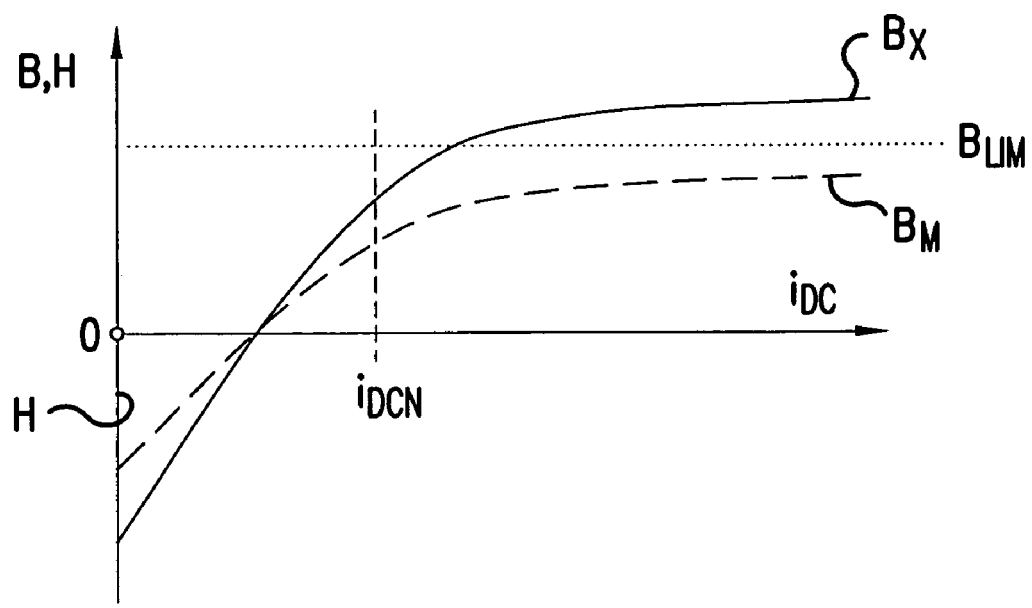
Figure 8:
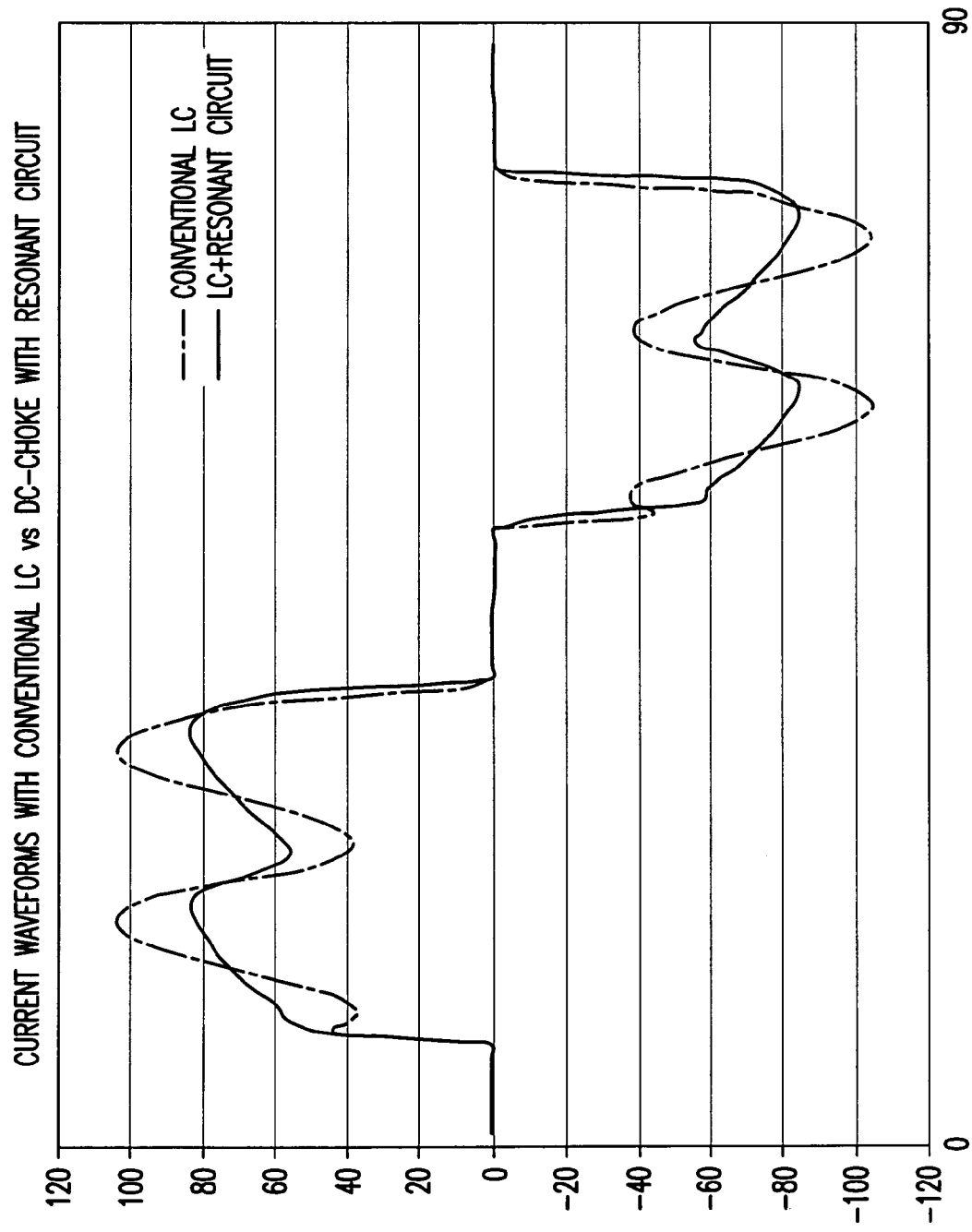
Figure 9:
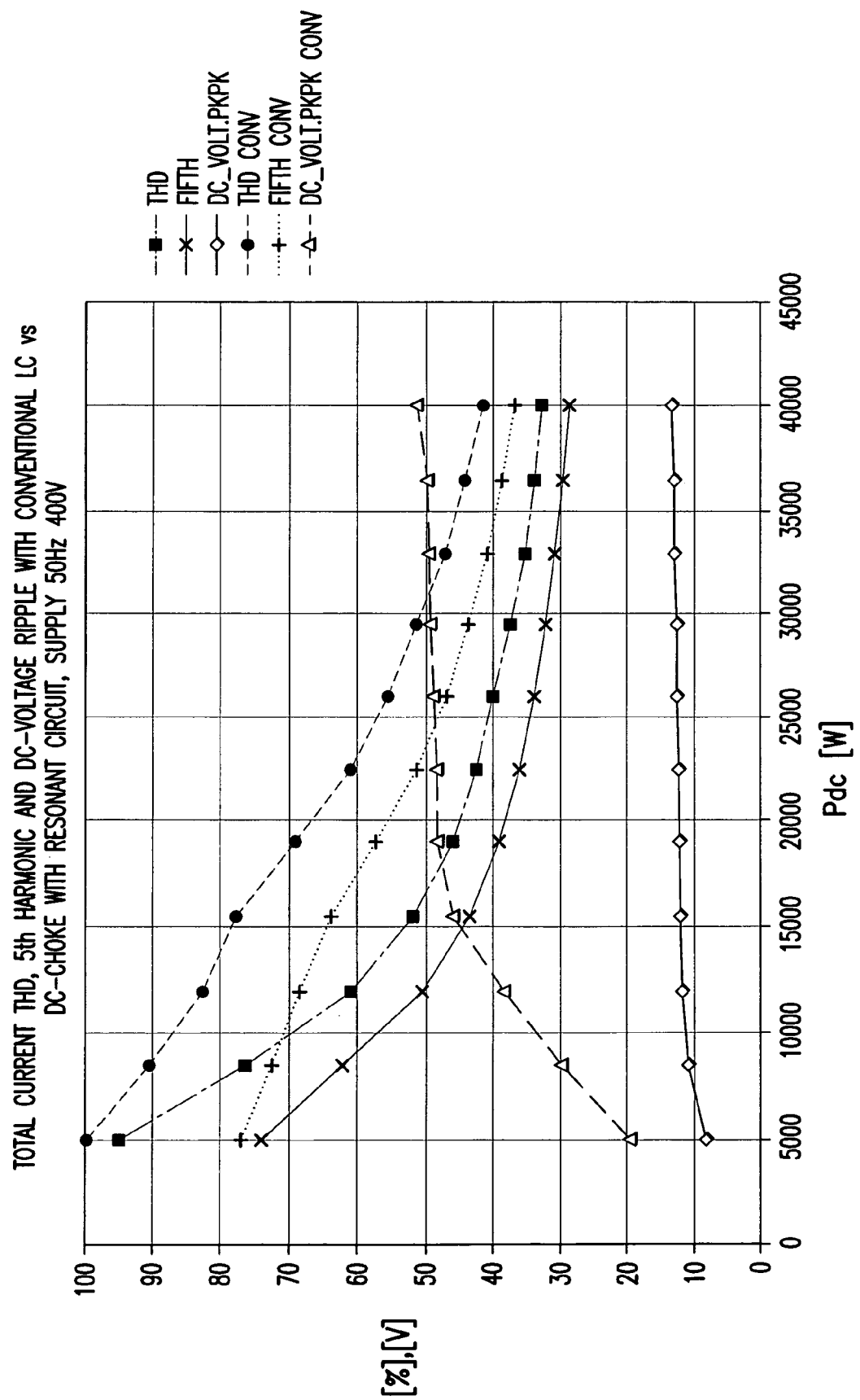

In the following, the invention will be described in more detail by the aid some embodiments with reference to the attached drawings, wherein FIG. 1 presents the main circuit of a conventional frequency converter FIG. 2 presents an active network bridge of a frequency converter, FIG. 3 presents an absorption circuit solution according to the invention FIG. 4 presents an implementation of a choke according to the invention FIG. 5 presents a second implementation of a choke according to the invention FIG. 6 presents a magnetization curve of the core material of the choke FIG. 7 presents the magnetization of parts of the choke with the permanent magnet solution according to the invention FIG. 8 presents a comparison of the waveforms of the mains current FIG. 9 presents a comparison of the harmonics of the mains current, the THD levels and the ripple of the intermediate circuit voltage.

DETAILED DESCRIPTION OF THE INVENTION

FIG. 1 presents the main circuit of a normal three-phase PWM frequency converter, in which is a network bridge 10 comprised of diodes for rectifying the three-phase alternating voltage R, S, T of the mains supply into the DC voltage of the DC voltage intermediate circuit, a filtering capacitor $C_{DC}$ of the DC voltage, a load bridge 11 comprised of three phase switches implemented with power semiconductors, which forms the three-phase output voltage U, V, W from the DC voltage of the intermediate circuit, and a control unit 12. The figure also presents both alternative choke solutions Lac and Ldc generally used to filter the harmonics of the mains current. The winding direction of the phase windings of the choke is marked with small dots next to the choke. A general DC choke solution is also one in which only a single branch-specific choke (either Ldc+ or Ldc−) is used.

A weakness of this kind of conventional frequency converter circuit with respect to the harmonics of the mains current is that the limits required by the standards are difficult to achieve without a choke that is large in size, and is therefore also expensive.

FIG. 2 presents an alternative method of implementing a network bridge 10. In this solution a so-called active front end (AFE) is used, which forms three-phase AC voltage from the DC voltage of the intermediate circuit on the mains supply side of the frequency converter. The amplitude difference and the phase-difference between this voltage and the mains supply voltage as well as the impedance of the filter circuit 9 determine what kind of current is taken from the mains supply. The drawback of the solution is that it is expensive, as a result of which it is generally only used in special cases.

FIG. 3 presents an integrated absorption circuit according to this invention, with which the harmonics of the mains supply current can be limited to the level required by the standards at a reasonable cost. The absorption circuit is arranged in the DC intermediate voltage circuit, in connection with the DC filter choke solution. In the solution a two-branch DC choke wound onto a common core is used, in which is a choke part ($L_1$, $L_2$) connected to both the +pole and the −pole of the DC intermediate circuit, and in which a third pillar ($L_3$) for the inductance of the absorption circuit is arranged in the choke core. Owing to the common core, the choke also has a certain mutual inductance, which does not have any special significance to the operation of the absorption circuit. The capacitor $C_1$ of the absorption circuit is connected according to FIG. 3 in series with the absorption choke in parallel with the filter capacitor $C_{DC}$.

Owing to the high-frequency currents of the $L_3$-$C_1$ resonance circuit, the capacitor $C_1$ must be of the low-loss type, e.g. manufactured from polypropylene film (the electrolytic capacitor generally used in DC circuits is not suited to this solution because of the large losses). When the actual filter capacitor of the intermediate circuit is manufactured with the same technology, it is possible to use a three-pole solution that is cheaper in terms of costs, in which both $C_1$ and $C_{DC}$ are disposed in the same enclosure. The capacitance values of $C_1$ and $C_{DC}$ are preferably dimensioned to be the same size.

FIG. 4 presents an example of an implementation of a choke according to this invention, which contains the winding parts $L_1$ and $L_2$ of the choke, the pillar parts 41, 42 and the yokes 44, 45 between the pillars. Between the lower yoke 45 and the pillars is an air gap 46. The $L_1$ and $L_2$ windings and pillars 41, 42 must be dimensioned according to the main current of the appliance, and therefore they are greater than the $L_3$ winding and core (pillar 43) of the absorption circuit, which is situated between the pillars 41, 42, and which can be dimensioned to be smaller because of the smaller current. The $L_3$ core can, in fact, be of the same size as the others if there is e.g. a technical manufacturing advantage. The inductance value of $L_3$ is preferably dimensioned to be approx. double in comparison to the inductance values of $L_1$ and $L_2$.

FIG. 5 presents a choke according to one preferred embodiment of this invention, in which a permanent magnet is situated in the core part of the choke. The permanent magnet 51 according to the invention is positioned at an angle (in the figure, at an angle of 45° with respect to the yoke and correspondingly to the longitudinal axis of the pillar) transversely in the corner of the choke core such that it fills the entire aperture in the core material. There can be many magnets (51, 52), each in its own corner. Air gaps 5a, 5b can be arranged on both sides of the permanent magnet. In addition it is also preferable that the cross-section surfaces of the pillar parts and the yoke parts 1a, 1b, 2a and 2b of the core are preferably of different magnitudes such that the cross-section surface (X) of the pillar is smaller than that of the yoke (Y). Owing to its angular positioning, the surface area $A_M$ of the permanent magnet is greater than the cross-section area $A_X$ of the part of the thinner core material. With the markings according to the figure, the ratio of the surface areas is:

$$\frac{A_M}{A_X} = \frac{\sqrt{X^2 + Y^2}}{X}$$

FIG. 6 presents a prior-art characteristic magnetization curve of the magnetic core material. The dimension H depicts the strength of the magnetic field, which is directly comparable to the current of the winding wound around the core, and the dimension B depicts the density of the magnetic flux in the core material. The limit values Bsat+ and Bsat− depict the saturation limits of the flux density, significantly greater than which the density of the magnetic flux does not grow irrespective of the strength of the magnetic field.

In a DC choke solution the magnetic circuit is generally dimensioned such that saturation still does not significantly reduce the inductance value of the choke at the nominal current. The saturation limit is not, e.g. with the transformer plate generally used as the core material of a choke, very abrupt, so it is normal to use approx. 70% of the saturation limit of the flux density as the dimensioning criterion of the nominal current, which is approx. 1.4 . . . 1.6 T.

FIG. 7 presents the characteristic waveforms associated with the invention presented in FIG. 5 as a function of the current $i_{DC}$ of the intermediate circuit. In the figure H is the strength of the magnetic field, $B_X$ the density of the magnetic flux in the pillar, $B_M$ is the density of the magnetic flux at the location of the permanent magnet and $B_{LIM}$ is the demagnetization limit of the permanent magnet. Owing to the permanent magnet, the curves start from negative values and grow to become positive along with the external current. $I_{DCN}$ describes the measuring point of the nominal current. Since the same magnetic flux travels through both the pillar and the magnet, the density of the magnetic flux in these parts is comparable vice versa to their cross-section surfaces. The magnetic circuit according to the invention is dimensioned such that at the strength of the magnetic field at which the flux density of the core material in the pillar rises to the saturation limit, the flux density at the location of the permanent magnet is lower than the demagnetization limit of the material used. In this way the flux density of the permanent magnet can never grow too large, which prevents permanent changing of the properties of the DC choke in special situations.

In FIG. 8 is an example of the typical waveforms of a mains supply current when a conventional DC choke (Conventional LC) is used and when the absorption circuit according to this invention (LC+Resonant Circuit) is in use.

FIG. 9 presents some typical waveforms with a main circuit solution provided with a conventional DC choke and with a solution according to this invention. The figure presents the behavior of the THD (THD and THD conv), the 5th harmonic (Fifth and Fifth conv) and the ripple of the DC voltage (DC_volt PKP and DC_voltPKPconv) as a function of the output power of the frequency converter in an example case in the power range 5 . . . 40 kW (the ending-conv refers in the figure to a conventional solution). As can be seen from the figure, with the solution according to the invention both the total THD and the 5th harmonic significantly decrease compared to a conventional LC circuit solution, e.g. at a nominal 40 kW output power THD 42% vs. 33% and 5th harmonic 38% vs. 29%. Also the ripple (DC_voltPKPK) of the intermediate circuit voltage significantly decreases, being in the example according to the figure e.g. in a 50 Hz network at 40 kW power output only approx. one-quarter of the ripple of a conventional LC circuit, 51V vs. 13V. The evenness of the intermediate circuit voltage has an advantageous effect on the operating requirements of the motor regulation. The advantages of the new solution also with partial loads are apparent, as can be seen from the figure.

It is obvious to the person skilled in the art that the different embodiments of the invention are not limited solely to the examples described above, but that they may be varied within the scope of the claims presented below.

The invention claimed is:

1. Wiring arrangement for limiting the harmonics of the current supplied from an AC mains supply to a frequency converter,
   which frequency converter can be connected to a three-phase AC mains supply,
   in which frequency converter is an uncontrolled network bridge (10) for rectifying the AC voltage of the AC electricity supply network, a DC intermediate circuit, in which is a filtering capacitor ($C_{DC}$), and a load bridge (11) provided with power semiconductor switches for forming three-phase AC voltage (U, V, W), and which load bridge can be controlled with pulse-width modulation by means of a control unit, and
   in which DC intermediate circuit is a choke, in which is a choke part (L1, L2) arranged on both the positive and the negative pole, and
   in which wiring arrangement is an absorption circuit for limiting the harmonics of the current supplied from the AC electricity supply network,
   characterized in that
   the absorption circuit is arranged in the DC intermediate voltage circuit,
   the absorption circuit contains a serial connection of a choke (L3) and a capacitor (C1) connected in parallel with a filter capacitor ($C_{DC}$), the choke of the DC intermediate voltage circuit is a two-branch DC choke wound onto a common core, which contains pillars and the yokes between them, and in which an additional pillar for the choke of the absorption circuit is arranged in the magnetic core of the choke.

2. Wiring arrangement according to claim 1,
characterized in that the inductance value of the choke of the absorption circuit is approx. double compared to the inductance values of the choke parts (Ldc+, Ldc−).

3. Wiring arrangement according to claim 2,
characterized in that the capacitance values of the capacitor of the absorption circuit and of the filtering capacitor are essentially of equal magnitude.

4. Wiring arrangement according to claim 2,
characterized in that one or more permanent magnets are arranged in the magnetic core of the choke that is used in the wiring arrangement.

5. Wiring arrangement according to claim 1,
characterized in that the capacitance values of the capacitor of the absorption circuit and of the filtering capacitor are essentially of equal magnitude.

6. Wiring arrangement according to claim 5,
characterized in that one or more permanent magnets are arranged in the magnetic core of the choke that is used in the wiring arrangement.

7. Wiring arrangement according to claim 1,
characterized in that one or more permanent magnets are arranged in the magnetic core of the choke that is used in the wiring arrangement.

8. Wiring arrangement according to claim 7,
characterized in that the permanent magnet is positioned at an angle with respect to the longitudinal direction of the part or parts of the magnetic core such that the cross-section surface of the permanent magnet is greater than the cross-section surface of the part of the magnetic core in question or the parts of the magnetic core in question.

9. Wiring arrangement according to claim 7,
characterized in that an air gap is arranged in one half or in both halves of the permanent magnet.

10. Wiring arrangement according to claim 7,
characterized in that the cross-section surfaces of the pillar parts and of the yoke parts of the magnetic core are of different magnitudes.

11. Wiring arrangement according to claim 7,
characterized in that there are two permanent magnets, positioned in opposite corners of the magnetic core.

12. A wiring arrangement according to claim 7,
characterized in that there are four permanent magnets, positioned in all the corners of the magnetic core.

13. Wiring arrangement for limiting the harmonics of the current supplied to a frequency converter from an AC mains supply, which frequency converter can be connected to a three-phase AC mains supply, in which frequency converter is an uncontrolled network bridge (10) for rectifying the AC voltage of the AC electricity supply network, a DC intermediate circuit, in which is a filtering capacitor ($C_{DC}$), and a load bridge (11) provided with power semiconductor switches for forming three-phase AC voltage (U, V, W), and which load bridge can be controlled with pulse-width modulation by means of a control unit, and in which DC intermediate circuit is a choke, in which is a choke part (L1, L2) arranged on both the positive and the negative pole, and in which wiring arrangement is an absorption circuit for limiting the harmonics of the current supplied from the AC electricity supply network, characterized in that the absorption circuit is arranged in the DC intermediate voltage circuit, the choke of the DC intermediate voltage circuit is a two-branch DC choke wound onto a common core, which contains pillars and the yokes between them, and in which an additional pillar for the choke of the absorption circuit is arranged in the magnetic core of the choke.

14. Appliance according to claim 13,
characterized in that the absorption circuit is a serial connection of a choke (L3) and a capacitor (C1) connected in parallel with a filter capacitor.

15. Appliance according to claim 13,
characterized in that the windings and pillars of the choke parts (L1 and L2) arranged on the positive and on the negative pole of the DC intermediate circuit are dimensioned to be greater than the winding and the core of the absorption circuit.

16. Appliance according to claim 13,
characterized in that the capacitor (C1) of the absorption circuit is a low-loss plastic capacitor, e.g. manufactured from polypropylene film.

17. Appliance according to claim 13,
characterized in that the filtering capacitor of the intermediate circuit is the same type as the capacitor of the absorption circuit, and the capacitors are arranged to have three poles such that both capacitors (C1, $C_{DC}$) are disposed in the same enclosure.

18. Appliance according to claim 13,
characterized in that one or more permanent magnets are arranged in the magnetic core of the choke in the appliance.

19. Appliance according to claim 13,
characterized in that the permanent magnet is positioned at an angle with respect to the longitudinal direction of the part or parts of the magnetic core such that the cross-section surface of the permanent magnet is greater than the cross-section surface of the part of the magnetic core in question or the parts of the magnetic core in question.

20. Appliance according to claim 13,
characterized in that an air gap is arranged in one half or in both halves of the permanent magnet.

* * * * *